United States Patent
Hayashi

(10) Patent No.: US 7,015,257 B2
(45) Date of Patent: Mar. 21, 2006

(54) PHOTO-POLYMERIZABLE INK-JET INK COMPOSITION

(75) Inventor: Akiko Hayashi, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 12 days.

(21) Appl. No.: 10/724,749

(22) Filed: Dec. 2, 2003

(65) Prior Publication Data

US 2004/0110862 A1    Jun. 10, 2004

(30) Foreign Application Priority Data

Dec. 5, 2002  (JP) .............................. 2002-353945

(51) Int. Cl.
  *C08F 2/48*   (2006.01)
  *C08F 2/50*   (2006.01)
(52) U.S. Cl. .......................... 522/181; 522/81; 522/74; 522/178; 522/909
(58) Field of Classification Search ............... 522/74, 522/81, 178, 182, 909
See application file for complete search history.

(56) References Cited

U.S. PATENT DOCUMENTS

| | | | |
|---|---|---|---|
| 6,593,390 B1 | 7/2003 | Johnson et al. | |
| 2001/0029867 A1 * | 10/2001 | Hayashi et al. | 106/31.6 |
| 2003/0149130 A1 * | 8/2003 | Kondo | 523/160 |

FOREIGN PATENT DOCUMENTS

| | | |
|---|---|---|
| EP | 0 599 218 A1 | 6/1994 |
| EP | 1 048 700 A1 | 11/2000 |
| EP | 1 142 965 A1 | 10/2001 |
| EP | 1 321 497 A1 | 6/2003 |
| JP | 62-64874 A | 3/1987 |

OTHER PUBLICATIONS

Database WPI, Section Ch, Week 199207 Derwent Publications Ltd., London, GB; AN 1992-053958, XP002269141 and JP 04 001205 A (Canon KK), dated Jan. 6, 1992.
Database WPI, Section Ch, Week 199117, Derwent Publications Ltd., London, GB; AN 1991-120584 XP002269142 and JP 03 058955 A (Nippon Kayaku KK), Mar. 14, 1991.

* cited by examiner

*Primary Examiner*—Sanza L. McClendon
(74) *Attorney, Agent, or Firm*—Frommer, Lawrence & Haug LLP; Matthew K. Ryan, Esq.

(57) ABSTRACT

A photo-polymerizable ink-jet ink composition comprises a photo-polymerizable resin consisting of photo-polymerizable monomers, a photo-polymerization initiator, and a coloring material and is substantially free from a solvent. The photo-polymerizable monomers contain a hexa-functional monomer in a proportion falling within the range of 10% by weight to 30% by weight with respect to a total amount of the ink composition. The photo-polymerizable monomer other than the hexa-functional monomer is selected from the group consisting of a bi-functional monomer, a combination of a bi-functional monomer and a mono-functional monomer, a combination of a bi-functional monomer and a tri-functional monomer, and a combination of a bi-functional monomer, a mono-functional monomer, and a tri-functional monomer.

2 Claims, No Drawings

PHOTO-POLYMERIZABLE INK-JET INK COMPOSITION

BACKGROUND OF THE INVENTION

1. Field of the Invention

This invention relates to an ink-jet ink composition for use in an ink jet printer, which performs a recording operation by use of a liquid ink composition. This invention particularly relates to a photo-polymerizable ink-jet ink composition, which is capable of being cured by irradiation of light.

2. Description of the Related Art

Ink jet recording techniques are printing techniques, wherein a liquid ink composition having a high fluidity is jetted out from fine nozzles and adhered to a recording medium, such as printing paper, and a print is thus formed. The ink jet recording techniques have advantages in that an image having a high resolution and good image quality is capable of being printed quickly with low noise and by use of a comparatively cheap apparatus. By virtue of the advantages described above, recently, the ink jet recording techniques have quickly become popular.

It is required for ink compositions utilized for the ink jet recording techniques to have various characteristics, such as a low viscosity, a surface tension sufficient for the formation of small liquid droplets jetted out from the nozzles of ink jet heads, a low volatility, and a good long-term stability.

Photo-polymerizable ink-jet ink compositions, which fall within one category of the ink-jet ink compositions, comprise a photo-polymerizable resin, a photo-polymerization initiator, and the like. Immediately after the printing operation, the photo-polymerizable ink-jet ink compositions are capable of being cured by the irradiation of light. Therefore, the photo-polymerizable ink-jet ink compositions have good drying characteristics and are free from the risk of an ink offset to the back of the printing paper. Since the photo-polymerizable ink-jet ink compositions are the ink compositions for use in the ink jet recording techniques, the characteristics, such as a sufficient surface tension, a low volatility, and a low viscosity, are required of the photo-polymerizable ink-jet ink compositions. Also, in particular, besides the characteristics described above, a high film strength and a low cure shrinkage are required of the photo-polymerizable ink-jet ink compositions, which are capable of being cured immediately by the irradiation of light.

It is currently considered that, in order for the ink compositions to be jetted out by use of ink jet heads for photo-polymerizable ink compositions, which ink jet heads have been developed for use in industrial applications, the viscosities of the ink compositions should be as low as at most 50 cps. Examples of the photo-polymerizable ink-jet ink compositions having the low viscosities described above include an ink composition using a solvent, as described in Japanese Unexamined Patent Publication No. 62(1987)-64874, and an ink composition using a low-viscosity resin, as described in U.S. Pat. No. 6,593,390.

However, with the ink composition using a solvent, as described in Japanese Unexamined Patent Publication No. 62(1987)-64874, since a volatile solvent, such as methyl ethyl ketone or ethanol, is utilized, the problems occur in that, accompanying the volatilization of the solvent, the viscosity of the ink composition becomes high, agglomeration of a coloring material occurs, and clogging of the ink jet head occurs. Therefore, the problems occur in that the long-term stability cannot be kept good. Also, the ink composition using the volatile solvent is not appropriate from the view point of keeping environmental loads low.

Also, the ink composition using a low-viscosity resin, as described in PCT Japanese Publication No. 2001-525479, is an ink composition containing a monomer and an oligomer. However, with the ink composition using a low-viscosity resin described above, such that the viscosity of the ink composition may be kept low, the proportion of the monomer having a small number of functional groups, such as a mono-functional monomer or a bi-functional monomer, is set to be high, and the proportion of the oligomer is set to be low. Therefore, though the viscosity of the ink composition is capable of being kept low, the problems occur in that the functionality of the resin as a whole cannot be kept high due to the low proportion of the oligomer, and in that the film strength cannot be kept high due to a low crosslinking density. As described above, in the cases of the ink composition using a low-viscosity resin, the constitution required of the ink composition for keeping the viscosity low and the constitution required of the ink composition for keeping the film strength high are incompatible with each other. Therefore, the photo-polymerizable ink-jet ink composition is produced at a certain level of mutual sacrifice of the viscosity and the film strength.

SUMMARY OF THE INVENTION

The primary object of the present invention is to provide a photo-polymerizable ink-jet ink composition having a low viscosity, which ink composition exhibits a good long-term stability, good curing characteristics, a high film strength, and a low cure shrinkage.

The present invention provides a photo-polymerizable ink-jet ink composition, comprising:
i) a photo-polymerizable resin consisting of photo-polymerizable monomers,
ii) a photo-polymerization initiator, and
iii) a coloring material,
the ink composition being substantially free from a solvent,
wherein the photo-polymerizable monomers contain a hexa-functional monomer in a proportion falling within the range of 10% by weight to 30% by weight with respect to a total amount of the ink composition, and
the photo-polymerizable monomer other than the hexa-functional monomer is selected from the group consisting of a bi-functional monomer, a combination of a bi-functional monomer and a mono-functional monomer, a combination of a bi-functional monomer and a tri-functional monomer, and a combination of a bi-functional monomer, a mono-functional monomer, and a tri-functional monomer.

The term "photo-polymerizable resin consisting of photo-polymerizable monomers" as used herein means that the photo-polymerizable resin does not contain any photo-polymerizable oligomer. Also, the term "substantially free from a solvent" as used herein means that a change in viscosity due to a solvent loss does not arise. Specifically, the term "substantially free from a solvent" as used herein means that the photo-polymerizable ink-jet ink composition in accordance with the present invention may contain a certain amount of a solvent, such that a change in viscosity due to a solvent loss does not arise.

The photo-polymerizable ink-jet ink composition in accordance with the present invention should preferably be modified such that a viscosity of the ink composition at a temperature of 23° C. is at most 50 cps.

Ordinarily, a photo-polymerizable resin contained in a photo-polymerizable ink-jet ink composition is constituted of an oligomer and a monomer. However, with the photo-polymerizable ink-jet ink composition in accordance with the present invention, the photo-polymerizable resin does not contain any photo-polymerizable oligomer having a high viscosity and is constituted of only the photo-polymerizable monomers. Therefore, with the photo-polymerizable ink-jet ink composition in accordance with the present invention, the viscosity of the ink composition is capable of being kept low such that the jetting-out performance from nozzles may be kept good. Also, since the photo-polymerizable ink-jet ink composition in accordance with the present invention is substantially free from a solvent, a change in viscosity due to a solvent loss does not occur. Therefore, with the photo-polymerizable ink-jet ink composition in accordance with the present invention, the problems do not occur in that, accompanying the volatilization of a solvent, the viscosity of the ink composition becomes high, agglomeration of the coloring material occurs, and clogging of an ink jet head occurs. Therefore, the photo-polymerizable ink-jet ink composition in accordance with the present invention is capable of exhibiting a good long-term stability.

Also, with the photo-polymerizable ink-jet ink composition in accordance with the present invention, the photo-polymerizable monomers contain the hexa-functional monomer in a proportion falling within the range of 10% by weight to 30% by weight with respect to the total amount of the ink composition. Therefore, the functionality of the photo-polymerizable resin as a whole is capable of being kept high, and a high crosslinking density is capable of being obtained. Accordingly, while the viscosity is being kept low, the photo-polymerizable ink-jet ink composition in accordance with the present invention is capable of yielding a high film strength.

Further, with the photo-polymerizable ink-jet ink composition in accordance with the present invention, the photo-polymerizable monomer other than the hexa-functional monomer is selected from the group consisting of the bi-functional monomer, the combination of the bi-functional monomer and the mono-functional monomer, the combination of the bi-functional monomer and the tri-functional monomer, and the combination of the bi-functional monomer, the mono-functional monomer, and the tri-functional monomer. Therefore, while the viscosity is being kept low, the photo-polymerizable ink-jet ink composition in accordance with the present invention is capable of having good curing characteristics and a low cure shrinkage. Specifically, since the hexa-functional monomer is poly-functional, a high crosslinking density is capable of being obtained, and strong film is capable of being formed. However, ordinarily, with the poly-functional monomer, the problems are encountered in that the cure shrinkage cannot be kept low. However, with the photo-polymerizable ink-jet ink composition in accordance with the present invention, as described above, the photo-polymerizable monomer other than the hexa-functional monomer is constituted of the bi-functional monomer alone. Alternatively, the photo-polymerizable monomer other than the hexa-functional monomer is constituted of the combination of the two kinds of the monomers, i.e. the bi-functional monomer and the mono-functional monomer. As another alternative, the photo-polymerizable monomer other than the hexa-functional monomer is constituted of the combination of the two kinds of the monomers, i.e. the bi-functional monomer and the tri-functional monomer. As a further alternative, the photo-polymerizable monomer other than the hexa-functional monomer is constituted of the combination of the three kinds of the monomers, i.e. the bi-functional monomer, the mono-functional monomer, and the tri-functional monomer. Therefore, while the viscosity is being kept low, the photo-polymerizable ink-jet ink composition in accordance with the present invention is capable of forming strong film and exhibiting a low cure shrinkage.

DETAILED DESCRIPTION OF THE INVENTION

The photo-polymerizable ink-jet ink composition in accordance with the present invention comprises:

i) the photo-polymerizable resin consisting of the photo-polymerizable monomers, ii) the photo-polymerization initiator, and iii) the coloring material, the ink composition being substantially free from a solvent, wherein the photo-polymerizable monomers contain the hexa-functional monomer in a proportion falling within the range of 10% by weight to 30% by weight with respect to the total amount of the ink composition, and the photo-polymerizable monomer other than the hexa-functional monomer is selected from the group consisting of the bi-functional monomer, the combination of the bi-functional monomer and the mono-functional monomer, the combination of the bi-functional monomer and the tri-functional monomer, and the combination of the bi-functional monomer, the mono-functional monomer, and the tri-functional monomer.

In the photo-polymerizable ink-jet ink composition in accordance with the present invention, the photo-polymerizable monomers contain the hexa-functional monomer in a proportion falling within the range of 10% by weight to 30% by weight with respect to the total amount of the ink composition. Also, the photo-polymerizable monomer other than the hexa-functional monomer is selected from the group consisting of the bi-functional monomer alone, the combination of the two kinds of the monomers, i.e. the bi-functional monomer and the mono-functional monomer, the combination of the two kinds of the monomers, i.e. the bi-functional monomer and the tri-functional monomer, and the combination of the three kinds of the monomers, i.e. the bi-functional monomer, the mono-functional monomer, and the tri-functional monomer. In cases where the proportion of the hexa-functional monomer is lower than 10% by weight with respect to the total amount of the ink composition, a sufficient film strength cannot be obtained.

In cases where the proportion of the hexa-functional monomer is higher than 30% by weight with respect to the total amount of the ink composition, the viscosity of the ink composition cannot be kept low.

Preferable examples of the hexa-functional monomers include dipentaerythritol hexaacrylate and caprolactone-modified dipentaerythritol hexaacrylate.

Examples of the bi-functional monomers include bi-functional acrylates, bi-functional methacrylates, and mixtures of two or more of the above-enumerated bi-functional monomers. Specifically, preferable examples of the bi-functional monomers include bi-functional acrylates, such as tripropylene glycol diacrylate, 1,4-butanediol diacrylate, 1,6-hexanediol diacrylate, 1,9-nonanediol diacrylate, and polyethylene glycol 400 diacrylate; and bi-functional methacrylates, such as 1,6-hexanediol dimethacrylate, neopentyl glycol dimethacrylate, triethylene glycol dimethacrylate, and ethylene glycol dimethacrylate. In particular, 1,9-nonanediol diacrylate has a low viscosity, a low volatility, good curing characteristics, and a low cure shrinkage and is therefore capable of being preferably employed in the photo-polymerizable ink-jet ink composition in accordance with the present invention.

Examples of the mono-functional monomers include mono-functional acrylates, mono-functional methacrylates, vinyl monomers, and mixtures of two or more of the above-enumerated mono-functional monomers. Specifically, examples of the mono-functional acrylates include alkyl acrylates, such as butyl acrylate; dicyclopentenyl ethyl acrylate; isobornyl acrylate; and phenol ethylene oxide-modified acrylate. In particular, mono-functional acrylates having a cyclic group added to the acryl group, e.g. isobornyl acrylate, have a high glass transition temperature (Tg) and exhibits a low viscosity, a low volatility, and a low cure shrinkage. Therefore, the mono-functional acrylates having a cyclic group added to the acryl group, e.g. isobornyl acrylate, are capable of being preferably employed in the photo-polymerizable ink-jet ink composition in accordance with the present invention. Preferable examples of the mono-functional methacrylates include isobornyl methacrylate, cyclohexyl methacrylate, glycidyl methacrylate, and isodecyl methacrylate. Preferably examples of the vinyl monomers include styrene, vinyl toluene, N-vinylpyrrolidone, and vinyl acetate. In particular, N-vinylpyrrollidone exhibits good curing characteristics and good dilution characteristics and is therefore capable of being preferably employed in the photo-polymerizable ink-jet ink composition in accordance with the present invention.

Preferable examples of the tri-functional monomers include trimethylolpropane triacrylate, pentaerythritol triacrylate, propoxy trimethylolpropane triacrylate, and ethoxylated trimethylolpropane triacrylate.

The proportion of the photo-polymerizable monomer other than the hexa-functional monomer may vary in accordance with the proportion of the hexa-functional monomer, which proportion is selected from the range of 10% by weight to 30% by weight with respect to the total amount of the ink composition. Also, the proportion of the photo-polymerizable monomer other than the hexa-functional monomer may vary in accordance with whether the photo-polymerizable monomer other than the hexa-functional monomer is constituted of the bi-functional monomer alone, the combination of the bi-functional monomer and the mono-functional monomer, the combination of the bi-functional monomer and the tri-functional monomer, or the combination of the bi-functional monomer, the mono-functional monomer, and the tri-functional monomer. However, for example, in cases where the photo-polymerizable monomer other than the hexa-functional monomer is constituted of the bi-functional monomer alone, and the proportion of the hexa-functional monomer is 30% by weight with respect to the total amount of the ink composition, the proportion of the bi-functional monomer should preferably fall within the range of 55% by weight to 65% by weight with respect to the total amount of the ink composition. Also, in cases where the proportion of the hexa-functional monomer falls within the range of 10% by weight to less than 30% by weight with respect to the total amount of the ink composition, the proportion of the bi-functional monomer should preferably fall within the range of 10% by weight to 80% by weight with respect to the total amount of the ink composition, and should more preferably fall within the range of 20% by weight to 80% by weight with respect to the total amount of the ink composition. In cases where the photo-polymerizable monomer other than the hexa-functional monomer is constituted of the combination of the bi-functional monomer and the mono-functional monomer, the proportion of the hexa-functional monomer falls within the range of 10% by weight to less than 30% by weight with respect to the total amount of the ink composition, and the proportion of the bi-functional monomer falls within the range of 10% by weight to 80% by weight with respect to the total amount of the ink composition, the proportion of the mono-functional monomer should preferably fall within the range of 0% by weight to 60% by weight with respect to the total amount of the ink composition, and should more preferably fall within the range of 0% by weight to 50% by weight with respect to the total amount of the ink composition. (In such cases, if the proportion of the mono-functional monomer is 0% by weight with respect to the total amount of the ink composition, the photo-polymerizable monomer other than the hexa-functional monomer will be constituted of the bi-functional monomer alone.) In such cases, if the proportion of the mono-functional monomer is higher than 60% by weight with respect to the total amount of the ink composition, the curing cannot be achieved sufficiently. In cases where the photo-polymerizable monomer other than the hexa-functional monomer is constituted of the combination of the bi-functional monomer and the tri-functional monomer, the proportion of the hexa-functional monomer falls within the range of 10% by weight to less than 30% by weight with respect to the total amount of the ink composition, and the proportion of the bi-functional monomer falls within the range of 10% by weight to 80% by weight with respect to the total amount of the ink composition, the proportion of the tri-functional monomer should preferably fall within the range of 0% by weight to 30% by weight with respect to the total amount of the ink composition, and should more preferably fall within the range of 0% by weight to 20% by weight with respect to the total amount of the ink composition. In such cases, if the proportion of the tri-functional monomer is higher than 30% by weight with respect to the total amount of the ink composition, the cure shrinkage cannot be kept low, and the viscosity cannot be kept low.

As the photo-polymerization initiator, acetophenone types of initiators, thioxanthone types of initiators, and the like, may be employed. Preferable examples of the photo-polymerization initiators include 2-methyl-1-[4-(methylthio) phenyl]-2-morpholinopropan-1-one, 2-benzyl-2-dimethylamino-1-(4-morpholinophenyl)-butane-1,2-hydroxy-2-methyl-l-phenyl-propan-1-one, and 2,4-dimethyl thioxanthone. It is also possible to employ benzophenone, diethoxyacetophenone, 4,4'-bisdiethylamino benzophenone, benzil, benzoin, benzoin ethyl ether, and the like. The above-enumerated photo-polymerization initiators may be used either alone or in combination. The proportion of the photo-polymerization initiator may fall within the range of 1% by weight to 20% by weight with respect to the total amount of the photo-polymerizable ink-jet ink composition, and should preferably fall within the range of 1% by weight to 10% by weight with respect to the total amount of the photo-polymerizable ink-jet ink composition.

Preferable examples of the photo-polymerization initiators include Irgacure 651, Irgacure 184, Darocure 1173, Irgacure 907, and Irgacure 369 (supplied by Ciba Chemical Speciality Co.); Kayacure DETX and Kayacure CTX (supplied by Nippon Kayaku Co.); Solvasron BIPE and Solvasron PIBE (supplied by Kurogane Kasei Co.); and Rucilin (supplied by Badische Anilin & Soda Fabrik A.G.).

The photo-polymerizable ink-jet ink composition in accordance with the present invention may also contain a sensitizing agent. Examples of the sensitizing agents include aliphatic amines, such as n-butylamine and triethylamine; and aromatic amines, such as a p-dimethylaminobenzoic acid ethyl ester.

Further, in order for gelation to be prevented from occurring during storage of the ink composition, a polymerization inhibitor may be added to the photo-polymerizable ink-jet ink composition in accordance with the present invention. Examples of the polymerization inhibitors include a hydroquinone monomethyl ether, and aluminum-N-nitrosophenylhydroxylamine.

Furthermore, the photo-polymerizable ink-jet ink composition in accordance with the present invention may contain at least one of various dispersing agents. Examples of the dispersing agents include a hydroxyl group-containing carboxylic acid ester, a salt of a long-chain polyaminoamide with a high-molecular weight acid ester, a salt of a high-molecular weight polycarboxylic acid, a salt of a long-chain polyaminoamide with a polar acid ester, a high-molecular weight unsaturated acid ester, a high-molecular weight copolymer, a modified polyurethane, a modified polyacrylate, a polyether ester type of anionic surface active agent, a naphthalenesulfonic acid-formalin condensate salt, a polyoxyethylene alkyl phosphoric acid ester, a polyoxyethylene nonyl phenyl ether, a polyester polyamine, and stearylamine acetate.

Specific examples of the dispersing agents include Anti-Terra-U (a polyaminoamide phosphoric acid salt); Anti-Terra-203/204 (a high-molecular weight polycarboxylic acid salt); Disperbyk-101 (a polyaminoamide phosphoric acid salt and an acid ester), 107 (a hydroxyl group-containing carboxylic acid ester), 110 (an acid radical-containing copolymer), 130 (a polyamide), 161, 162, 163, 164, 165, 166, 170 (a high-molecular weight copolymer); 400; Bykumen (a high-molecular weight unsaturated acid ester); BYK-P104, P105 (a high-molecular weight unsaturated acid polycarboxylic acid); P104S, 240S (a high-molecular weight unsaturated acid polycarboxylic acid and silicon); and Lactimon (a long-chain amine, an unsaturated acid polycarboxylic acid, and silicon), which are supplied by BYK Chemie Co.

Specific examples of the dispersing agents also include Efka 44, 46, 47, 48, 49, 54, 63, 64, 65, 66, 71, 701, 764, 766; and Efkapolymer 100 (a modified polyacrylate), 150 (an aliphatic modified polymer), 400, 401, 402, 403, 450, 451, 452, 453 (a modified polyacrylate), 745 (a copper phthalocyanine type), which are supplied by Efka CHEMICALS Co. Specific examples of the dispersing agents further include Flowren TG–710 (a urethane oligomer); Flowren DOPA–15B (an acryl oligomer); Flowren SH–290, SP–1000; and Polyflow No. 50E, No. 300 (an acryl type copolymer), which are supplied by Kyoeisha Chemical Co., Ltd. Specific examples of the dispersing agents still further include Disparon KS–860, 873SN, 874 (a high-molecular weight dispersing agent), #2150 (an aliphatic polybasic carboxylic acid), #7004 (a polyether ester type); and DA–703–50 (a polyester acid amide amine salt), which are supplied by Kusumoto Kasei Co.

Specific examples of the dispersing agents further include Demor RN, N (a naphthalenesulfonic acid-formalin condensate sodium salt), MS. C, SN-B (an aromatic sulfonic acid-formalin condensate sodium salt), EP; Homogenol L-18 (a polycarboxylic acid type of high-molecular weight compound); Emulgen 920, 930, 931, 935, 950, 985 (a polyoxyethylene nonyl phenyl ether); Acetamin 24 (a coconut amine acetate), 86 (a stearylamine acetate), which are supplied by Kao Corp. Specifice xamples of the dispersing agents still further include Solsperse 5000 (a phthalocyanine ammonium salt type), 13940 (a polyester amine type), 17000, 18000 (a fatty acid amine type), 22000, 24000, 28000, and 32000, which are supplied by Avisia Co.

As the coloring material, a pigment should preferably be employed. As the pigments, inorganic pigments and organic pigments, which are ordinarily utilized in the fields of the printing technique, may be utilized. Examples of the pigments include a wide variety of known pigments, such as carbon black, cadmium red, chrome yellow, cadmium yellow, Titan Yellow, chromium oxide, viridian, Titan Cobalt Green, ultramarine blue, Prussian Blue, cobalt blue, an azo type pigment, a phthalocyanine type pigment, a quinacridone type pigment, an isoindolinone type pigment, a dioxazine type pigment, a threne type pigment, a perylene type pigment, a thioindigo type pigment, a quinophthalone type pigment, and a metal complex pigment.

As the coloring material, a dye may also be employed. The dye should preferably be selected from oil-soluble dyes, such as an azo dye, a metal complex salt dye, a naphthol dye, an anthraquinone dye, an indigo dye, a carbonium dye, a quinone imine dye, a xanthene dye, a cyanine dye, a quinoline dye, a nitro dye, a nitroso dye, a benzoquinone dye, a naphthoquinone dye, a phthalocyanine dye, and a metal phthalocyanine dye.

The pigments and the dyes enumerated above may be used alone or in combination. The proportion of the coloring material should preferably fall within the range of 0.1% by weight to 20% by weight with respect to the total amount of the ink composition.

When necessary, various known additives may be added to the photo-polymerizable ink-jet ink composition in accordance with the present invention. Examples of the additives include a photo-polymerization initiating auxiliary, a viscosity adjusting agent, an anti-oxidant, an anti-septic agent, a mildew-proofing agent, silicone oil, a surface active agent, a surface lubricating agent, an anti-foaming agent, and a light stabilizer.

The present invention will further be illustrated by the following non-limitative examples.

EXAMPLES

Example 1

A mixture of 220 parts by weight of Solsperse 24000 (supplied by Avisia Co.) acting as a dispersing agent, 420 parts by weight of carbon black (MA11, supplied by Mitsubishi Chemical Corporation) acting as a pigment, and 1,000 parts by weight of 1,9-nonanediol diacrylate (1.9NDA, supplied by Kyoeisha Chemical Co., Ltd.) acting as a bi-functional monomer was subjected to a dispersing process using a beads mill, in which the residence time was approximately 20 minutes. In this manner, the carbon black was dispersed to a size of at most 500 nm. After the dispersing process was performed, coarse particles contained in the resulting dispersion were removed by filtration. Thereafter, 40 parts by weight of isobornyl acrylate (IBXA, supplied by Kyoeisha Chemical Co., Ltd.) acting as a mono-functional monomer, 27.7 parts by weight of 1,9-nonanediol diacrylate acting as a bi-functional monomer, 15 parts by weight of dipentaerythritol hexaacrylate (M400, supplied by Toagosei Chemical Industry Co., Ltd.) acting as a hexa-functional monomer, 7.6 parts by weight of a photo-polymerization initiator (Irgacure 907, supplied by Ciba Chemical Speciality Co.), 1.1 parts by weight of a sensitizing agent (DETX, supplied by Nippon Kayaku Co.), and 0.1 part by weight of a polymerization inhibitor (Q1301, supplied by Wako Pure Chemical Industries, Ltd.) were added to 8.5 parts by weight of the dispersion described above. In this manner, an ink composition was prepared.

Examples 2, 3, 4, and 5

An ink composition was prepared in the same manner as that in Example 1, except that the blending proportions listed in Table 1 shown below were employed.

Example 6

An ink composition was prepared in the same manner as that in Example 1, except that, besides the mono-functional monomer and the bi-functional monomer used in Example 1, trimethylolpropane triacrylate (M309, supplied by Toagosei Chemical Industry Co., Ltd.) acting as a tri-functional monomer was used as the photo-polymerizable monomer, and except that the blending proportions listed in Table 1 shown below were employed.

Comparative Example 1

An ink composition was prepared in the same manner as that in Example 1, except that trimethylolpropane triacrylate acting as a tri-functional monomer was used in lieu of the bi-functional monomer, and except that the blending proportions listed in Table 1 shown below were employed.

Comparative Example 2

An ink composition was prepared in the same manner as that in Example 1, except that a urethane oligomer (U4HA, supplied by Shin-nakamura Kagaku Co.) acting as a tetra-functional oligomer was used in lieu of the hexa-functional monomer, and except that the blending proportions listed in Table 1 shown below were employed.

Comparative Example 3

An ink composition was prepared in the same manner as that in Comparative Example 2, except that the blending proportions listed in Table 1 shown below were employed.

Comparative Example 4

An ink composition was prepared in the same manner as that in Example 1, except that the blending proportions listed in Table 1 shown below were employed.

Comparative Example 5

An ink composition was prepared in the same manner as that in Example 1, except that epoxy acrylate (M8530, supplied by Toagosei Chemical Industry Co., Ltd.) acting as a tri-functional oligomer and trimethylolpropane triacrylate acting as a tri-functional monomer were used in lieu of the hexa-functional monomer, and except that the blending proportions listed in Table 1 shown below were employed.

Comparative Examples 6 and 7

An ink composition was prepared in the same manner as that in Comparative Example 5, except that the blending proportions listed in Table 1 shown below were employed.

Comparative Example 8

An ink composition was prepared in the same manner as that in Example 1, except that a urethane oligomer (U15HA, supplied by Shin-nakamura Kagaku Co.) acting as a penta-deca-functional oligomer was used in lieu of the hexa-functional monomer, and except that the blending proportions listed in Table 1 shown below were employed.

Comparative Example 9

An ink composition was prepared in the same manner as that in Example 1, except that the blending proportions listed in Table 1 shown below were employed.

Comparative Examples 10, 11, and 12

An ink composition was prepared in the same manner as that in Example 1, except that the blending proportions listed in Table 1 shown below were employed.

Table 1 shown below lists the blending proportion (in units of % by weight), the viscosity, the surface tension, the film strength, the cure shrinkage, and the jetting-out performance of each of the ink compositions prepared in Examples 1 to 6 and Comparative Examples 1 to 12. The viscosity of the ink composition was measured by use of an E type viscometer (RE115L type, supplied by Toyo Sangyo K.K.) at a temperature of 23° C. and a rotation speed of 10 rpm. Also, the surface tension was measured by use of an automatic tensiometer (CBVP-Z type, supplied by Kyowa Kaimen Kagaku Co.) at a temperature of 23° C. Further, the film strength and the cure shrinkage were evaluated in the manner described below. Specifically, the ink composition was applied onto a PET film by use of a 4-mil bar coater, and a coating film having a thickness of approximately 10 μm was thereby formed. The thus formed coating film was then cured by use of a metal halide lamp having an arc length of 25 cm (supplied by Eye Graphics Co.) at an output of 120 W/cm and a belt speed of 20 m/min. In this manner, a coating film sample was prepared. As for the thus prepared coating film sample, the film strength and the cure shrinkage were evaluated in the manner described below.

Film strength: The coating film sample was rubbed with manually held Kymwipe, and the occurrence of scratches on the coating film sample was investigated. In cases where it was confirmed that the scratches did not occur on the coating film sample, the film strength of the coating film sample was evaluated as being "○." In cases where it was confirmed that the scratches occurred on the coating film sample, the film strength of the coating film sample was evaluated as being "x."

Cure shrinkage: The cure shrinkage of the coating film sample was investigated visually. In cases where it was confirmed that the cure shrinkage did not occur, the cure shrinkage characteristics were evaluated as being "○." In cases where it was confirmed that the cure shrinkage occurred, the cure shrinkage characteristics were evaluated as being "x."

Furthermore, the jetting-out performance of each of the ink compositions was evaluated in the manner described below. Specifically, the ink composition was jetted out from an ink jet printer head (supplied by Xaar Co.). In cases where the ink composition was capable of being jetted out from the ink jet printer head, the jetting-out performance was evaluated as being "○." In cases where the ink composition was not capable of being jetted out from the ink jet printer head, the jetting-out performance was evaluated as being "x."

droplets jetted out from the ink jet head nozzle. Further, with the photo-polymerizable ink-jet ink composition prepared in each of Example 1 to Example 6 in accordance with the present invention, the photo-polymerizable monomers contain the hexa-functional monomer in a proportion falling

TABLE 1

| | | Example 1 | 2 | 3 | 4 | 5 | 6 | Comparative Example 1 | 2 | 3 | 4 | 5 | 6 | 7 | 8 | 9 | 10 | 11 | 12 |
|---|---|---|---|---|---|---|---|---|---|---|---|---|---|---|---|---|---|---|---|
| Mono-functional monomer | IBXA | 40 | 18 | 32 | | | 43 | 40 | 40 | 18 | 46 | 40 | 40 | 18 | 40 | 28 | 73 | 78 | 58 |
| Bi-functional monomer | 1,9-NDA | 33 | 55 | 26 | 58 | 73 | 25 | | 33 | 55 | 37 | 23 | 33 | 55 | 33 | 20 | | | |
| Tri-functional monomer | M309 | | | | | | 10 | 33 | | | | 10 | | | | | | | |
| Hexa-functional monomer | M400 | 15 | 15 | 30 | 30 | 15 | 10 | 15 | | | 5 | | | | | 40 | 15 | 10 | 30 |
| Tetra-functional oligomer | U4HA | | | | | | | | 15 | 15 | | | | | | | | | |
| Tri-functional oligomer | M8530 | | | | | | | | | | | 15 | 15 | 15 | | | | | |
| Pentadeca-functional oligomer | U15HA | | | | | | | | | | | | | | 15 | | | | |
| Photo-polymerization initiator | Irg. 907 | 7.6 | 7.6 | 7.6 | 7.6 | 7.6 | 7.6 | 7.6 | 7.6 | 7.6 | 7.6 | 7.6 | 7.6 | 7.6 | 7.6 | 7.6 | 7.6 | 7.6 | 7.6 |
| Sensitizer | DETX | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 |
| Polymerization inhibitor | Q1301 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pigment | Carbon black MA11 | 2.1 | 2.1 | 2.1 | 2.1 | 2.1 | 2.1 | 2.1 | 2.1 | 2.1 | 2.1 | 2.1 | 2.1 | 2.1 | 2.1 | 2.1 | 2.1 | 2.1 | 2.1 |
| Dispersing agent | Sol. 24000 | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 | 1.1 |
| Total | | 100 | 100 | 100 | 100 | 100 | 100 | 100 | 100 | 100 | 100 | 100 | 100 | 100 | 100 | 100 | 100 | 100 | 100 |
| Viscosity (cps) | | 21 | 22 | 40 | 42 | 22 | 25 | 42 | 21 | 23 | 10 | 23 | 19 | 21 | 26 | 58 | 22 | 17 | 49 |
| Surface tension (mN/m) | | 33 | 35 | 33 | 34 | 35 | 33 | 34 | 32 | 35 | 32 | 33 | 33 | 35 | 34 | 32 | 33 | 33 | 34 |
| Film strength | | ○ | ○ | ○ | ○ | ○ | ○ | ○ | X | X | X | X | X | X | X | ○ | X | X | X |
| Cure shrinkage | | ○ | ○ | ○ | ○ | ○ | ○ | X | ○ | ○ | ○ | ○ | ○ | ○ | ○ | X | ○ | ○ | ○ |
| Jetting-out performance | | ○ | ○ | ○ | ○ | ○ | ○ | ○ | ○ | ○ | ○ | ○ | ○ | ○ | ○ | X | ○ | ○ | ○ |

With the photo-polymerizable ink-jet ink composition prepared in each of Example 1 to Example 6 in accordance with the present invention, the photo-polymerizable resin does not contain any photo-polymerizable oligomer having a high viscosity and is constituted of only the photo-polymerizable monomers. Therefore, as clear from Table 1, with the photo-polymerizable ink-jet ink composition prepared in each of Example 1 to Example 6 in accordance with the present invention, the viscosity of the ink composition is capable of being kept low such that the jetting-out performance from nozzles may be kept good. Also, the photo-polymerizable ink-jet ink composition prepared in each of Example 1 to Example 6 in accordance with the present invention has a surface tension sufficient for forming small within the range of 10% by weight to 30% by weight with respect to the total amount of the ink composition, and the photo-polymerizable monomer other than the hexa-functional monomer is constituted of the bi-functional monomer alone (Examples 4 and 5), the combination of the bi-functional monomer and the mono-functional monomer (Examples 1, 2, and 3), or the combination of the bi-functional monomer, the mono-functional monomer, and the tri-functional monomer (Example 6). Therefore, while the viscosity is being kept low, the photo-polymerizable ink-jet ink composition in accordance with the present invention is capable of forming strong film and exhibiting a low cure shrinkage.

Comparative Example 10 corresponds to the ink composition, in which the bi-functional monomer employed in Example 1 is entirely replaced by the mono-functional monomer. Comparative Example 11 corresponds to the ink composition, in which the bi-functional monomer and the tri-functional monomer employed in Example 6 are entirely replaced by the mono-functional monomer. Also, Comparative Example 12 corresponds to the ink composition, in which the bi-functional monomer employed in Example 4 is entirely replaced by the mono-functional monomer. However, with the ink composition prepared in each of Comparative Examples 10 and 11, the surface of the ink composition cannot be cured with the irradiation of the light produced by the UV lamp. Also, with the ink composition prepared in Comparative Examples 12, the surface of the ink composition is capable of being cured, but a sufficient film strength cannot be obtained. Specifically, in cases where the photo-polymerizable monomers are constituted of only the hexa-functional monomer and the mono-functional monomer, a sufficient crosslinking density cannot be obtained, and the film strength at the time of the curing is apt to become low. This is presumably because there is a difference in configuration at the time of the curing between the mono-functional monomer and the bi-functional monomer, which is the essential constituent of the photo-polymerizable ink-jet ink composition in accordance with the present invention. More specifically, it is considered that, in order for the viscosity of the ink composition to be kept low, monomers having a low functionality (the mono-functional monomer or the bi-functional monomer) maybe added to the ink composition. However, it is considered that, with the mono-functional monomer, since a straight-chain polymer is formed at the time of the curing, the crosslinking density is low, and a sufficient film strength cannot be obtained at the time of the curing. Also, it is considered that, with the bi-functional monomer, since a three-dimensional net-like polymer is capable of being formed, a high film strength is capable of being obtained, while the viscosity is being kept low, and the cure shrinkage is capable of being kept low.

With the ink composition containing the tetra-functional oligomer (Comparative Examples 2 and 3), the ink composition containing the tri-functional oligomer (Comparative Examples 5, 6, and 7), and the ink composition containing the pentadeca-functional oligomer (Comparative Example 8), since the content of the oligomer is kept to be as low as 15 parts by weight, the viscosity is capable of being kept low. However, since the functionality of the resin as a whole is low, and the crosslinking density is low, a sufficient film strength cannot be obtained.

The photo-polymerizable ink-jet ink composition in accordance with the present invention has the requirement in that the photo-polymerizable monomers contain the hexa-functional monomer in a proportion falling within the range of 10% by weight to 30% by weight with respect to the total amount of the ink composition. However, with the ink composition prepared in Comparative Example 4, in which the proportion of the hexa-functional monomer is lower than 10% by weight with respect to the total amount of the ink composition, a sufficient film strength cannot be obtained. Also, with the ink composition prepared in Comparative Example 9, in which the proportion of the hexa-functional monomer is higher than 30% by weight with respect to the total amount of the ink composition, the cure shrinkage cannot be kept low, the viscosity becomes high, and the jetting-out performance cannot be kept good. Further, with the ink composition prepared in Comparative Example 1, since the proportion of the tri-functional monomer is high, the cure shrinkage occurs.

As described above, with the photo-polymerizable ink-jet ink composition in accordance with the present invention, the photo-polymerizable resin does not contain any photo-polymerizable oligomer having a high viscosity and is constituted of only the photo-polymerizable monomers. Therefore, with the photo-polymerizable ink-jet ink composition in accordance with the present invention, the viscosity of the ink composition is capable of being kept low such that the jetting-out performance from nozzles may be kept good. Also, with the photo-polymerizable ink-jet ink composition in accordance with the present invention, the photo-polymerizable monomers contain the hexa-functional monomer in a proportion falling within the range of 10% by weight to 30% by weight with respect to the total amount of the ink composition. Therefore, while the viscosity is being kept low, the photo-polymerizable ink-jet ink composition in accordance with the present invention is capable of yielding a high film strength. Further, with the photo-polymerizable ink-jet ink composition in accordance with the present invention, the photo-polymerizable monomer other than the hexa-functional monomer is constituted of the bi-functional monomer alone. Alternatively, the photo-polymerizable monomer other than the hexa-functional monomer is constituted of the combination of the two kinds of the monomers, i.e. the bi-functional monomer and the mono-functional monomer. As another alternative, the photo-polymerizable monomer other than the hexa-functional monomer is constituted of the combination of the two kinds of the monomers, i.e. the bi-functional monomer and the tri-functional monomer. As a further alternative, the photo-polymerizable monomer other than the hexa-functional monomer is constituted of the combination of the three kinds of the monomers, i.e. the bi-functional monomer, the mono-functional monomer, and the tri-functional monomer. Therefore, the photo-polymerizable ink-jet ink composition in accordance with the present invention is capable of exhibiting a low cure shrinkage.

What is claimed is:

1. A photo-polymerizable ink-jet ink composition, comprising:
   i) a photo-polymerizable composition consisting of photo-polymerizable monomers,
   ii) a photo-polymerization initiator, and
   iii) a coloring material,
   the ink composition being substantially free from a solvent,
   wherein the photo-polymerizable monomers contain a hexa-functional monomer in a proportion falling within the range of 10% by weight to 30% by weight with respect to a total amount of the ink composition, and
   the photo-polymerizable monomer other than the hexa-functional monomer is selected from the group consisting of:
   (i) a bi-functional monomer;
   (ii) a combination of a bi-functional monomer and a mono-functional monomer;
   (iii) a combination of a bi-functional monomer and a tri-functional monomer; and
   (iv) a combination of a bi-functional monomer, a mono-functional monomer, and a tri-functional monomer.

2. A photo-polymenizable ink-jet ink composition as defined in claim 1 wherein a viscosity of the ink composition at a temperature of 23° is at most 50 cps.

* * * * *